Dec. 8, 1959 C. H. FRICK 2,916,040
GOVERNING DEVICE FOR ENGINES
Filed Oct. 12, 1956
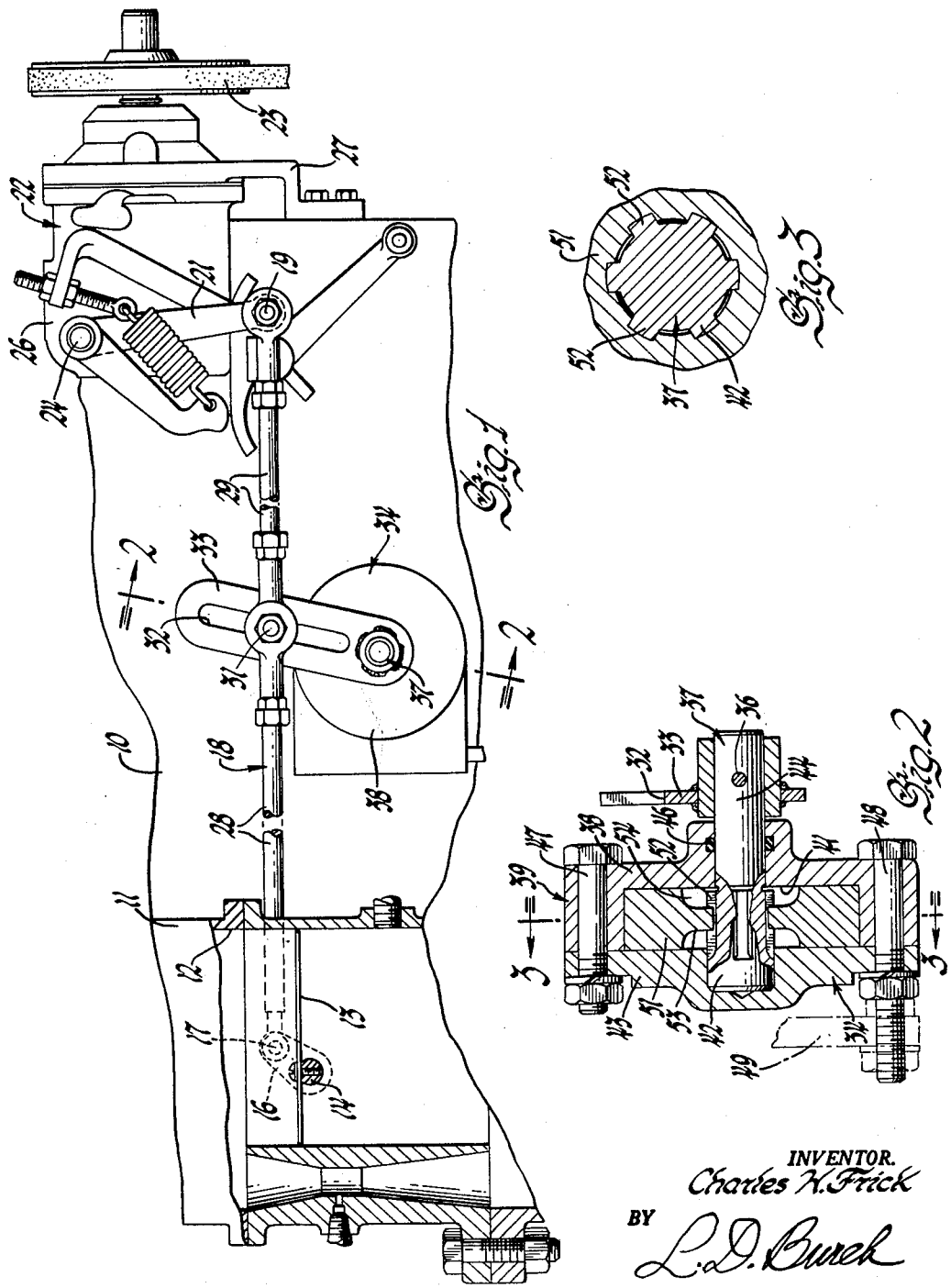
INVENTOR.
Charles H. Frick
BY
L. D. Burch
ATTORNEY United States Patent Office 2,916,040
Patented Dec. 8, 1959

2,916,040

GOVERNING DEVICE FOR ENGINES

Charles H. Frick, Pontiac, Mich., assignor to General Motors Corporation, Detroit, Mich., a corporation of Delaware Application October 12, 1956, Serial No. 615,565

4 Claims. (Cl. 137—47)

This invention relates to governing devices for engines and has particular relation to governing devices embodying damper means for damping fluttering and vibrational movements of various parts of the mechanism of such devices.

It is proposed to provide a damper device in the linkage connecting the governor of an engine and the engine throttle. The linkage is adjustable with respect to the device to vary the effect of the damper upon the engine governor and the throttle. Preferably, it is proposed to use a rotary damper so that the damper may be constructed of relatively inexpensive parts and be easily and effectively connected to the governor and the throttle.

In the drawings:

Figure 1 is a fragmentary view of an internal combustion engine embodying a governor device embracing the principles of the invention.

Figure 2 is a cross sectional view of the rotary damper embodied in the governor device disclosed by Figure 1. Figure 2 is taken substantially on line 2—2 of Figure 1 looking in the direction of the arrows thereon.

Figure 3 is a fragmentary cross sectional view of the damper device illustrated by Figure 2. Figure 3 is taken substantially along the line 3—3 of Figure 2 looking in the direction of the arrows thereon.

The engine 10 embodying the invention comprises an induction manifold 11 having a manifold passage 12 therein for supplying air or combustible mixtures to the engine for operating the engine. The induction manifold 11 is adapted to be controlled by a throttle 13 pivoted on a shaft 14 extending across the induction passage 12 and mounted at the opposite ends thereof in the manifold 11. The shaft 14 has an arm 16 by which the throttle 13 may be operated in any suitable manner for controlling the engine 10. In the present instance the arm 16 is pivotally connected at 17 to one end of an operating linkage 18 having the opposite end thereof pivotally connected at 19 to an actuating arm 21 of an engine 22. While the governor 22 may be of any suitable type responsive through a belt and pulley or other suitable drive indicated at 23 to the speed of the engine or to the speed of any vehicle or device driven by the engine, in the present instance, the governor 22 is a part of the governing system for diesel engines shown by application S.N. 477,809 for Power Plant Governor Control Mechanism filed December 27, 1954, in the name of the same inventor, Charles H. Frick. The shaft 24 responds to the speed of the engine or the vehicle or other devices to move the arm 21 to control the throttle 13 through the linkage means 18. In the present instance the linkage means 18 is formed by links 28 and 29 pivotally connected at the adjacent ends thereof by a bolt or other suitable pivot means indicated at 31. The bolt 31 has head and lock nut means adapted rigidly to secure the bolt in any desired position in a slot 32 formed in an actuating arm 33 of a rotary or other suitable damper device indicated at 34. Arm 33 is adapted to be secured by a pin 36 on the end of a shaft 37 projecting through an end wall 38 of a damper casing 39. The damper casing 39 is formed to provide a damper chamber 41 embodying surfaces of revolution formed about the axis of shaft 37. The shaft 37 extends across the damper chamber 41 and has an enlarged end 42 mounted in the opposite end wall 43 of the casing 39. The enlarged end 42 of the shaft 37 extends across the chamber 41 substantially to the end wall 38 and is there provided with a shoulder extending radially inwardly to the reduced end 44 of the shaft. A seal 46 prevents leakage of fluid around the shaft 37 either inwardly or outwardly of the shaft 37. The enlarged end 42 is mounted in a recess in the opposite end wall 43, which terminates within the wall 43, thereby preventing leakage of fluid inwardly or outwardly around the enlarged end of the shaft. The casing 39 is adapted to be made in two parts, the wall 43 being removable from the remainder of the casing to expose the chamber 41 entirely across one end of the chamber 41. Two parts of the casing may be secured together by bolts 47 and 48, the bolts 48 being of excessive length to provide means 49 for securing the casing 39 rigidly to the frame of the engine. The chamber 41 is adapted to receive a damper wheel 51, the outer surface of which is formed to closely fit the surfaces of revolution forming the chamber 41. The larger end 42 of the shaft within the chamber 41 and the inner peripheral surface of the wheel 51 are formed to provide spline means 52 for securing the wheel against rotation on the shaft. The opposite sides of the central part of the wheel 51 may be relieved at 53 to provide reservoir means 54 within the central part of the chamber 41. The clearance space between the surfaces forming the chamber 41 and the surfaces of the wheel 51 and the shaft 37 are filled with silicone or other suitable damping fluid.

It will be apparent that any vibration originating in the governor 22 or the throttle 13 will tend to be damped by the force required to relatively rotate the wheel 51 within the casing 39. It is considered preferable to make the clearance within the chamber whatever may be required to apply the damping force required. However, it will be apparent that once the damper 34 is constructed it may be desirable to vary the damping force within limits. This may be done by adjusting the bolt 31 in the slot 32 in the arm 33. Since the links 28 and 29 are pivotably mounted on the bolt 31 it will be apparent that this adjustment may be made throughout the length of the slot 32.

It has been observed that only a negligible force is required to move the wheel 51 slowly within the casing 39 during any continuous opening or closing movement of the throttle 13. However, when the throttle 13 or the governor arm 21 tends to vibrate the damping force appears to increase enormously, thereby causing the damping means 34 to resist and practically eliminate such vibrations. It appears that vibrations of this character tend to produce a large number of reversals in the movement of the wheel 51 within the casing 39 thereby causing the wheel to be effected by static frictions at each of these reversals. However, when the wheel is moved continuously in any direction it is obvious that only sliding friction effects the wheel, thereby causing the wheel to move easily and not appreciably to oppose the opening or closing movements of the throttle 13.

In the governing system for deisel engines shown by S.N. 477,809 the natural frequency of the output shaft governor indicated in Figure 1 at 22 is such that it responds to the natural frequencies of the engine vacuum governor assembly employed in controlling the fuel supply to the engine. Because the mechanical output shaft governor controls the speed setting valve of the engine vacuum governor, it sometimes occurs that the two governors become unbalanced or out of phase and thereby produce an actuation of the engine control system that is not desirable. This may occur when an output shaft speed change takes place, which may cause the output shaft governor to respond by changing the speed setting valve position. This changes the engine governor speed setting which in turn changes the output shaft governor speed and so on. The damper 34 slows the response of the output shaft governor to a point where its natural frequency is much lower than that of the engine governor. This results in a corrective action effecting the engine governor that rapidly decreases the amplitude of the engine governor to a value where stable operation results.

The damper device obviously can be used on any engine with or without governing means to stabilize the operation to any part of the mechanism which tends to flutter or fluctuate when a uniform change in one direction is desired.

I claim:

1. A governor device for engines comprising a throttle element adapted to control the speed of an engine, a governor element adapted to control the position of said throttle element, a damper element adapted to damp vibrations in said first and second mentioned elements and resulting from the operation of said engine, a pivoted arm operated by said governor element, a pivoted arm operating said throttle element, a pivoted arm operating said damper element, a system of links pivotally connecting said arms, and means connecting said system of links to one of said arms at different distances from the axis of rotation of said one of said arms.

2. A governor device for engines as defined by claim 1 and in which said system of links comprises a pair of links having the adjacent ends thereof connected to said damper element arm and the opposite ends connected to said governor element and throttle element arms, said connecting means connecting said adjacent ends of said links to said damper element arm.

3. A rotary damper device comprising a casing having end walls with bearings formed therein and having a damper chamber formed therein between said end walls, said damper chamber being formed by surfaces of revolution about an axis extending transversely of said chamber and said end walls, a damper wheel disposed in said damper chamber and being formed to closely fit said surfaces of revolution, a shaft rotatably supporting said damper wheel in said damper chamber and having a reduced end and an enlarged end, said shaft ends being formed to provide journals rotatably mounted in said bearings in said end walls, spline means formed on said enlarged end of said shaft and within said damper chamber and between said journals and on said damper wheel and locking said shaft and said damper wheel against relative rotation, said reduced end of said shaft being smaller than said spline means on said damper wheel to permit relative axial movement of said damper wheel over said reduced end of said shaft, means securing said end walls of said casing together for closing said casing on said damper wheel and said shaft, and damping fluid means in the clearance space between said casing and said wheel and said shaft and within said spline means, said spline means on said damper wheel being narrower than said damper chamber to provide a reservoir for said damping fluid means.

4. A rotary damper device as defined by claim 3 and in which said reduced end of said shaft projects through one of said end walls, said enlarged end being enclosed within the other of said end walls.

References Cited in the file of this patent

UNITED STATES PATENTS

| | | |
|---|---|---|
| 2,302,322 | Howard | Nov. 17, 1942 |
| 2,468,667 | Holbrook | Apr. 26, 1949 |
| 2,543,929 | Olman | Mar. 6, 1951 |
| 2,775,317 | Sinisterra | Dec. 25, 1956 |